United States Patent [19]

Carruth, Jr.

[11] 4,369,507

[45] Jan. 18, 1983

[54] CONDITIONAL UPDATING METHOD AND APPARATUS ASSOCIATED WITH A MICROCOMPUTER SYSTEM FOR AUTOMATICALLY INDICATING AND RECORDING PARAMETERS THAT SPATIALLY DEFINE LOCATIONS OF SEISMIC EXPLORATION SPREAD AND SOURCE ARRAYS

[75] Inventor: H. T. Carruth, Jr., Anaheim, Calif.

[73] Assignee: Chevron Research Company, San Francisco, Calif.

[21] Appl. No.: 169,338

[22] Filed: Jul. 16, 1980

[51] Int. Cl.³ .......................... G01V 1/20; G01V 1/34
[52] U.S. Cl. ...................................... 367/56; 367/55; 367/63; 367/74; 364/421; 364/200
[58] Field of Search .................. 367/14, 37, 55, 56, 367/60, 71, 63, 74; 346/33 C; 364/421, 900, 200

[56] References Cited

U.S. PATENT DOCUMENTS

| | | | |
|---|---|---|---|
| 4,202,048 | 5/1980 | Edwards | 367/74 |
| 4,214,128 | 7/1980 | Bovee et al. | 367/60 |
| 4,257,098 | 3/1981 | Lacy | 371/33 |
| 4,280,201 | 7/1981 | Mart | 367/56 |
| 4,285,052 | 8/1981 | Bobbitt | 367/56 |
| 4,323,990 | 4/1982 | Goode et al. | 367/60 |

*Primary Examiner*—Nelson Moskowitz
*Attorney, Agent, or Firm*—Edward J. Keeling; H. D. Messner

[57] ABSTRACT

The present invention relates to a method and apparatus for conditionally updating source-detector array parameters related to a seismic exploration system, especially during generation and collection of seismic data using a vibratory source detector array positioned at known locations along a line of survey at the earth's surface. The updated array and source parameter are generated as bits of digital data in a microcomputer system of a ground position controller housed in a recording truck associated with the exploration system of interest.

5 Claims, 8 Drawing Figures

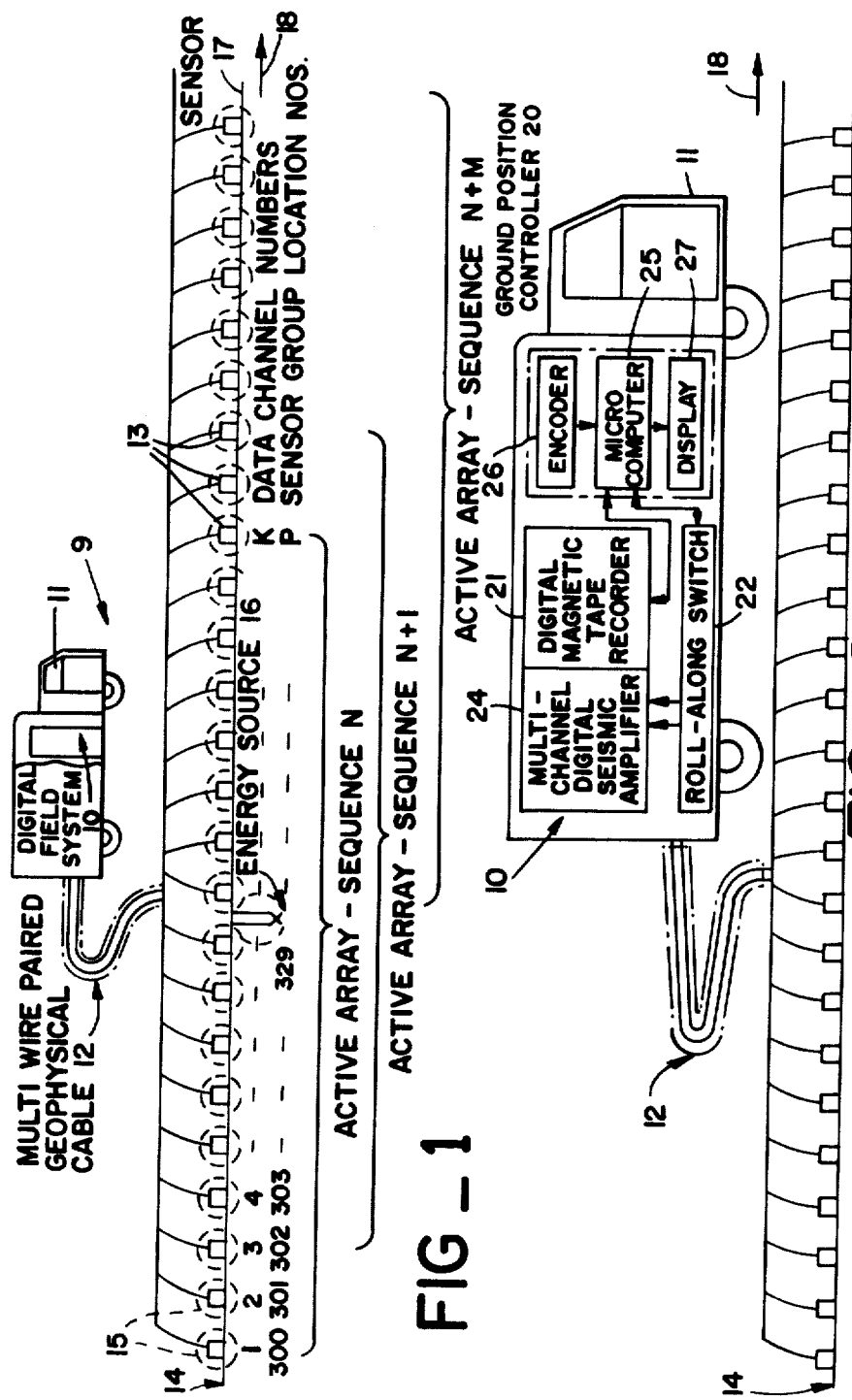

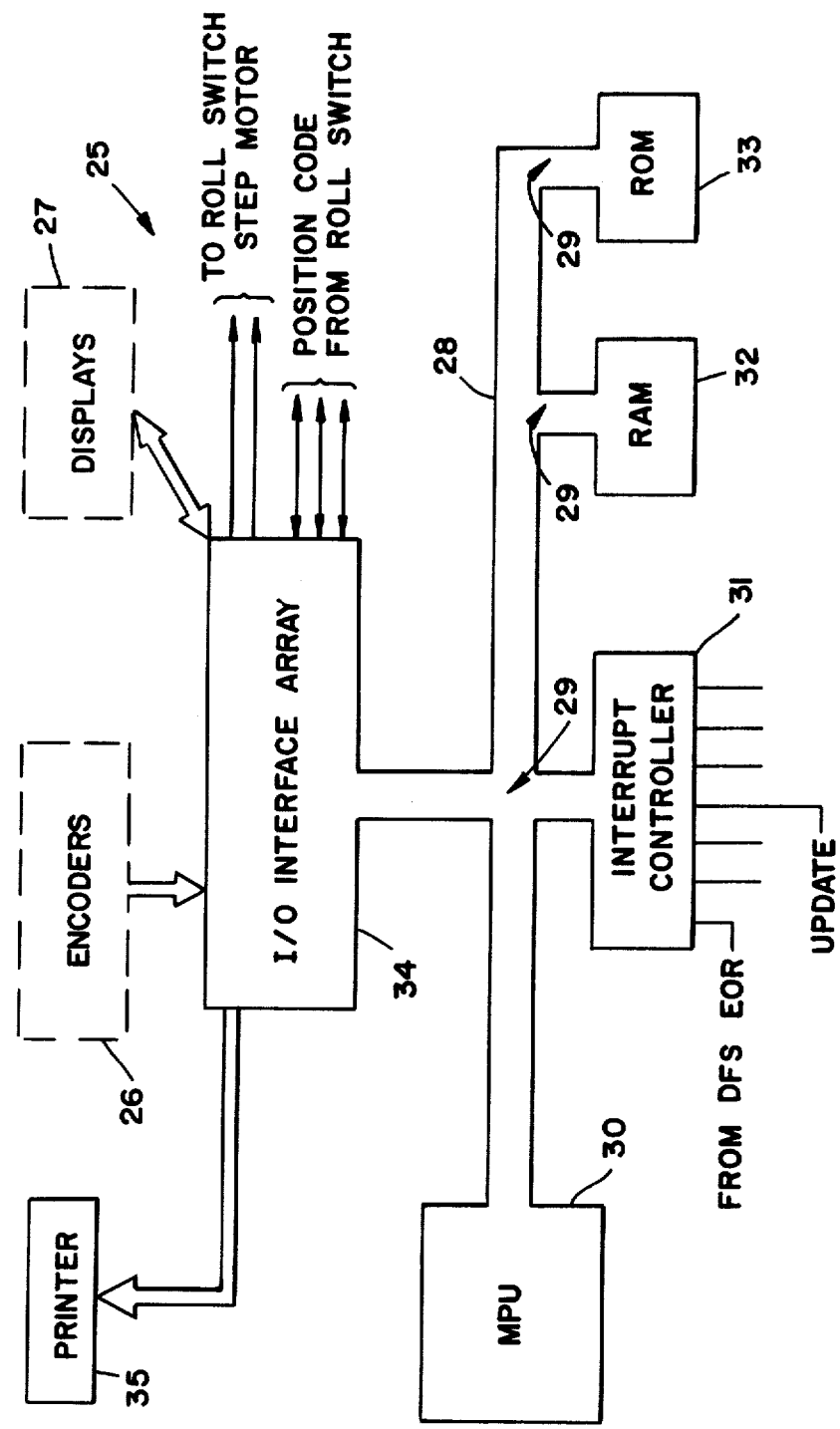
FIG_3

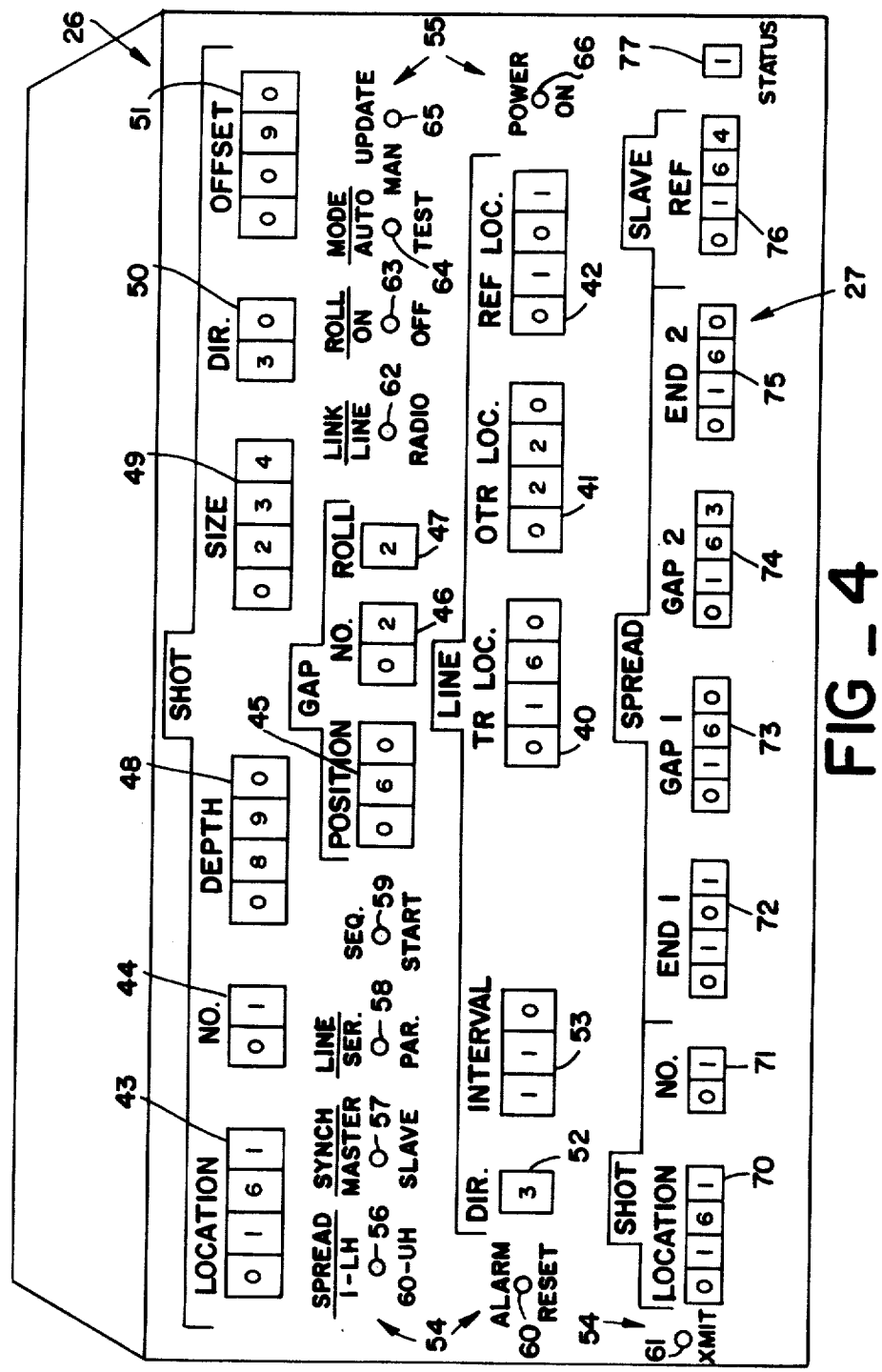
FIG_4

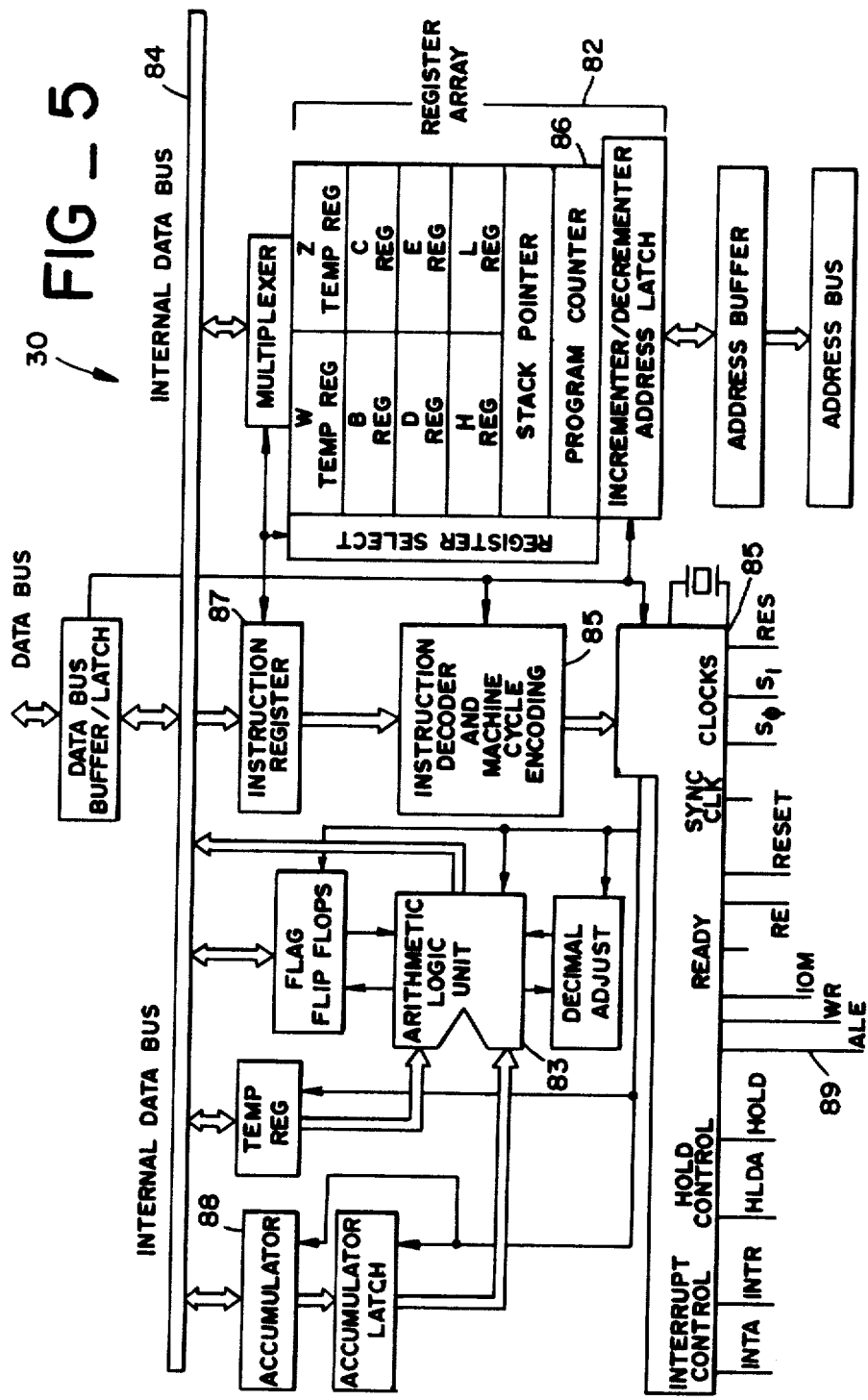

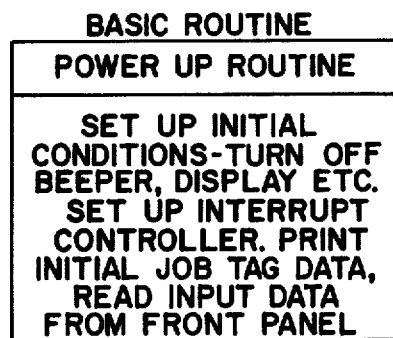
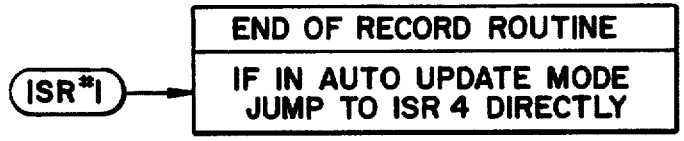
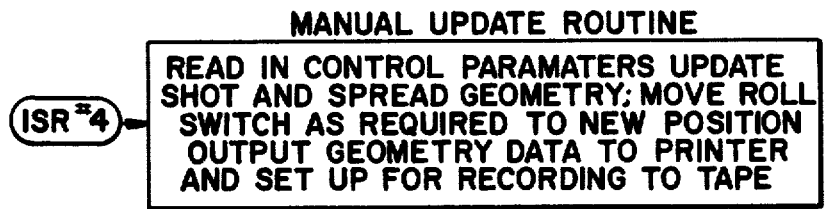
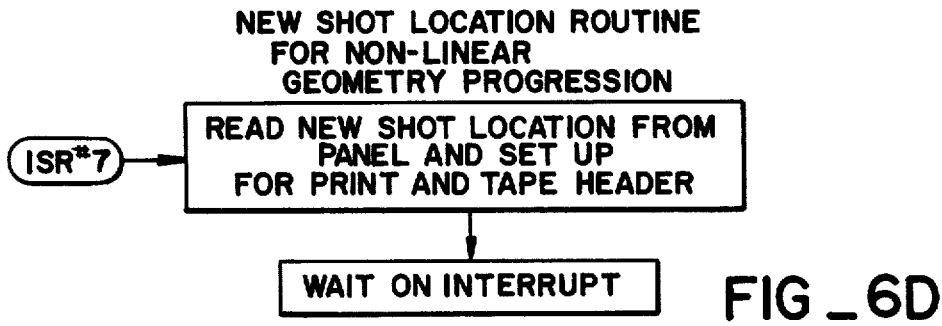

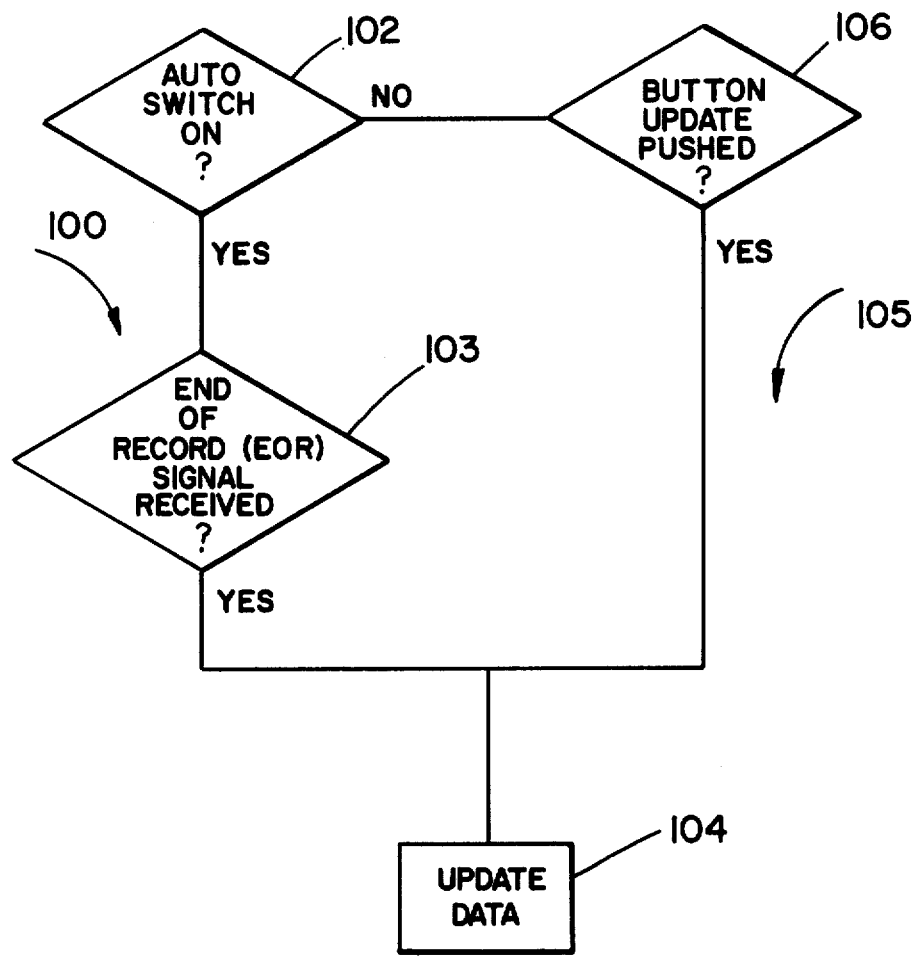
FIG _ 7

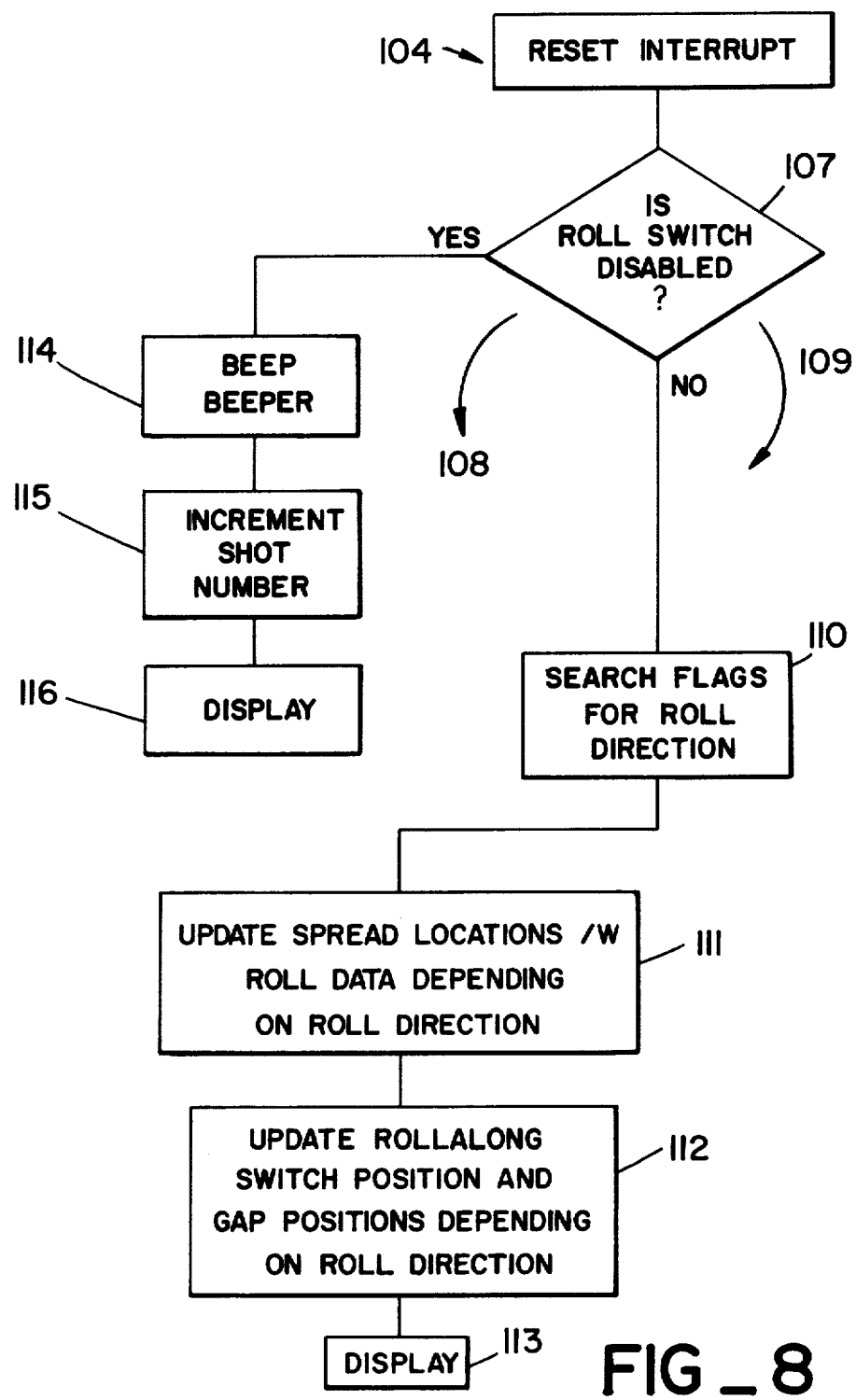

CONDITIONAL UPDATING METHOD AND APPARATUS ASSOCIATED WITH A MICROCOMPUTER SYSTEM FOR AUTOMATICALLY INDICATING AND RECORDING PARAMETERS THAT SPATIALLY DEFINE LOCATIONS OF SEISMIC EXPLORATION SPREAD AND SOURCE ARRAYS

FIELD OF THE INVENTION

This invention relates to an improved method and apparatus for providing control of field shooting and recording operations during exploration of hydrocarbons, or the like.

RELATED APPLICATIONS

My following commonly assigned application is incorporated herein by reference:

Ser. No. 169,336 filed July 16, 1980 for "Ground Position Controller And Method For Automatically Indicating And Recording Parameters That Spatially Define Locations of Seismic Exploration Spread And Source Arrays".

Also, there is an additional commonly assigned application in the area of seismic exploration of interest:

Ser. No. 169,345 filed July 16, 1980 for "Ground Position Controller And Method For Automatically Indicating Parameters That Spatially Cross-Reference The Locations Of Seismic Spread And Source Arrays During Exploration For Hydrocarbons And The Like".

BACKGROUND OF THE INVENTION

While the above-identified ground position controller and method of my related applications provide for accurate generating, formatting, displaying and recording of seismic information (including next-in-time sensor and source array geographic locations), additional annotational problems remain.

E.g., if the seismic source used to generate the seismic waves is a vibrator, modifications must be made to the input parameters (to the above-mentioned ground position controller) each shooting cycle to indicate that the source is being vibratorily swept a particular selected number of times without change in its position along the line of survey.

SUMMARY OF THE INVENTION

The present invention relates to a method and apparatus for conditionally updating source-detector array parameters related to a seismic exploration system, especially during generation and collection of seismic data using a vibratory source positioned at a known location along a line of survey at the earth's surface. The updated array and source parameters are generated as bits of digital data in a microcomputer system interconnected via a bus to the exploration system.

If the sweep count is below the maximum encoded count, the next-in-time array positions are not generated nor displayed. The sweep count counter is updated, however, each operating cycle. Finally, when the sweep count matches the maximum count, new positional data for subsequent operations are generated and displayed, for operator perusal.

DESCRIPTION OF THE DRAWINGS

These and other functions of the present invention will become evident to those skilled in the art after a reading of the detailed description of embodiments thereof, following a brief description of the appended drawings.

FIGS. 1 and 2 illustrate an exploration system incorporating the present invention in which a source of energy and an array of sensors connected to a recording truck, are illustrated.

FIGS. 3, 4, and 5 are diagrams of certain aspects of a microcomputer system of the present invention used within the exploration system of FIGS. 1 and 2.

FIGS. 6A-6D, 7 and 8 are flow diagrams which illustrate the present invention.

DESCRIPTION OF PREFERRED EMBODIMENTS OF THE INVENTION

FIG. 1 illustrates operation of seismic exploration system 9 of the present invention.

As shown, system 9 includes digital field system (DFS) 10, housed within recording truck 11 and electrically interconnected via a multiwire geophysical cable 12 to an array of sensors 13 positioned at the earth's surface 14. Ground locations 15 are represented as surrounding both the array of sensors 13 and seismic energy source 16, all positioned along the surface 14. As previously mentioned in the CDPR collection process, the ground locations 15 would, more likely than not, have been previously surveyed prior to implementation of the seismic surveying operation along the line of survey 17 in the direction of arrow 18. Hence, each of the locations 15 can be designated by a particular position number (or P number) along the line 17. The P numbers set forth in FIG. 1 include the numbers 300, 301 . . . 329. Also, the number of sensors 13 forming each array (as the data is collected) is identified by the sequence numbers N, N+1 . . . N+M designating the length of the active array as the sensors 13 are advanced in the direction of arrow 18.

Annotating the positions of the sensor arrays is aided by the fact that each sensor is associated with a particular data channel 1, 2 . . . K of the DFS 10 as the data is collected. For usual operations K can be 24, 48, 60, 96, 120, etc., as required, although, of course, the present invention is not limited to a particular channel capacity number, but can be varied to accommodate any field arrangement. Each sensor position and each source location can be indicated using the ground position controller 20 of the present invention in conjunction with recording unit 21 of the DFS 10.

FIG. 2 illustrates ground position controller 20 in more detail.

Briefly, the ground position recorder 20 operates in the field to insure integrity between prescribed and actual field shooting and recording operations by a series of steps, namely, storing, manipulating and displaying data related (i) to field positions of the source and sensor array by position number, (ii) to array and source geometrical locations (both present and next-in-time) based on field geometrical algorithms and (iii) to recording array and source parameters so that realistic annotation of the subsequently collected seismic data, can be made. For these purposes, the operator utilizes encoded data provided initially by him using encoders 26, manipulated results generated by the controller 20 based on part in stored relationships within the microcomputer 25, and finally indicating geometrical data set forth at displays 27 and as header information at recording unit 21.

Since the present invention deals conveniently with the CDPR process, the array of sensors 13 and source of energy 16 are continually "rolled forward" in the direction of arrow 18 using rollalong switch 22. That is to say, after the seismic data has been recorded at the digital tape recording unit 21 (after amplification by amplifier 24), the array of sensors 13 (and source 16) located at a first series of positions P as shown, are "rolled forward" in the direction of arrow 18. Note that the changing of the active array pattern of FIG. 1 in the aforementioned manner is identified by the array sequence designated N, N+1 . . . N+M, as previously mentioned. But, the array and source geometry is always known at the recording truck 11 provided the positional locations 300, 301, 302 . . . P of FIG. 1 for the particular active array N, N+1 . . . N+M are correctly identified and recorded during each recording cycle, via operation of the ground position controller 20 of the present invention; of particular importance is the manipulation of data associated with the field geometry of the sensors 13 and source 16 via geometrical and performance algorithms stored within microcomputer 25 of the controller 20.

As previously mentioned, microcomputer 25 is used to predict correct array positions as the rollalong switch 23 switches between "active" and "inactive" arrays of sensors. The microcomputer 25 can also interact with the rollalong switch 22, provided the latter is capable of accepting the multi-bit codes conventionally generated by the microcomputer 25. (In this regard, an approved roll-along switch is manufactured under the tradename "Rolalong Switch", by Input-Output, Inc., Houston, Tex., and consists of a series of contacts attached to a central shaft of a stepping motor controlled via a digital input code from the microcomputer 25.)

Rollalong switch 22 usually includes a display (not shown) associated with one or two of the locational positions of the active array of sensors 13. Such display, of course, changes as the active array changes sequential pattern in the manner of N, N+2 . . . N+M, as shown in FIG. 1. The rollalong switch 22 also includes a digital generator (not shown) for generating a second multi-bit code indicative of the position P of a member of the sensor array as header indicia at the recorder 21. However, as previously mentioned, the latter digital code represents only an arbitrary number and is not a true geodytic location.

FIG. 3 illustrates microcomputer 25 of controller 20 in still more detail.

As shown, the microcomputer 25 includes a system bus 28 used to connect encoders 26 and displays 27 via I/O interrupt array 34 to microprocessor unit 30 (MPU) of the microcomputer 25. Also connected via the bus 28 and ports 29 are interrupt controller 31, RAM 32, ROM 33 (in addition to I/O interfacing array 34) which operates in conventional fashion to calculate, manipulate, store and display position data associated with the exploration operation. Note that the I/O array 34 not only links the MPU 30 with the encoders 26 and displays 27, but it is also used to provide data to the printer 35 under control of MPU 30 to generate a permanent record of the displayed data at displays 27, if desired.

Bus 28 essentially comprises three separate buses, a data bus, an address bus and a control bus. The data bus is conventional: it not only carries information to and from MPU 30, but it is also used to fetch instructions that have been stored in ROM 33, as required, as well as carries data from/to the encoders 26 and displays 27 of FIG. 2, by way of (or independent of) RAM 32.

Addressing segments of the data is the annotations function of the address bus. It is capable of selecting a location in RAM 32 or ROM 33 or a particular address in the MPU 30 when appropriately signaled, say by interrupt controller 31. The control bus controls the sequencing and nature of the operation using common selector commands, e.g., "Read", "Write", etc.

Additionally, it should be noted, the system interrupts are usually carried via the control bus to implement the scheduling and servicing of different ports, as required by operations. In the present invention, interrupt controller 31 handles seven (7) vectored priority interrupts for the MPU 30, as explained below, including an end-of-record interrupt (EOR) generated by the digital field system 10, FIG. 1, to indicate the end of the collection cycle, and to initiate operations in the next-in-time cycle.

In general, in servicing the interrupts, preservation of program status is required and is easily carried by the MPU 30. Since the controller 31 is both vectored and priority oriented, it has the responsibility of providing vectored interrupts to the MPU 30, of identifying the nature of the interrupt, (or its branching address) and of establishing priority between competing interrupts. In particular in servicing the EOR interrupt, the steps set forth in FIGS. 9B and 9D are executed to bring about automatic updating of the array and source geometry to achieve the next-in-time collection of data, based in part on the field algorithms contained in equation sets I, II, III or IV set forth below.

FIG. 4 illustrates the nature of the data provided at encoders 26 and displays 27.

The operator initially calibrates positions of the exploration array and source with previously surveyed geographical stations. Information has been already encoded via the encoders 26 for use by microcomputer 25 before operations begin. Encoded data at encoders 26 includes:

(i) truck location (vis-a-vis survey stations of known geographic location) encoded at encoder sub-element 40;

(ii) slave truck location (if applicable) encoded using encoder sub-element 41;

(iii) reference station location (where the end of the spread is initially positioned) encoded via encoding sub-element 42;

(iv) initial location of the energy source encoded using encoder sub-element 43;

(v) the number of shots or sweeps encoded at sub-element 44;

(vi) the initial gap position, stored at sub-element 45;

(vii) the gap spacing encoded using encoder sub-element 46; and (viii) gap roll increment encoding using sub-element 47.

The operator also has the initial responsibility of encoding other data which, for the most part, does not change during the survey. In this regard, the operator may have to only initially encode shot depth and size (at sub-elements 48 and 49), shot direction and offset (at sub-elements 50 and 51) as well as data related to the spread, as to its direction (at sub-element 52) and the distance between groups (at sub-element 53).

Switch arrays generally indicated at 54 and 55 are also set by the operator. Data provided by these switch arrays, relate to two or three possible switch states of the switches 56-66 which are, for example, related to the type of survey and run conditions occurring after the survey is underway.

[In this regard, the functions of the switches are as follows: Switch 56 specifies line direction; switch 57 specifies truck rank, i.e. determines if the reference truck is the master (or slave) in relationship with an alternate truck; switch 58 specifies operations in either a serial or in a parallel mode, the mode being related to whether one or two arrays of geophones are used in-line or parallel to the corresponding source line; pushbutton switches 59 and 60 relate to start up and to alarm reset functions respectively; switch 59, of course, initializes operations after all synchronization has been completed; switch 60 turns off the audio alarm in the event that a signal of some importance has been generated causing the alarm to also activate; transmit switch 61 "triggers" the energy source, and is operative only after the operator is assured the correctness of the array and source positions as displayed at displays 27; switches 62 and 63 related to (i) the "trigger" link associated with the activation of the source (electrical wire-line or radio) and (ii) whether or not the roll switch 22 (FIG. 2) is to be in an active or passive state. Three-position switch 64 establishes whether or not the operation is to be in a manual, automatic or test mode; update switch 65 operates only when the switch 64 is in the manual mode and is used (in manual mode) to initiate advances of the roll switch so as to generate new ground locations for the array after the recording cycle has been completed; and switch 66 is a conventional power-on switch. ]

Displays 27 may be conventional LED segmented displays except that they are microcomputer implemented. Primary purposes of the displays 27: to provide data to the operator so that determinations as to whether or not the system is functioning correctly can be made, and to allow the operator to act as an independent cross-checker of the correctness of the displayed ground locations. The data at displays 27 relate for the most part to the type of run being undertaken and survey conditions.

[In this regard, the nature of the displays 27 is as follows: subdisplays 70 and 71 indicate shot location and number of shots per location, respectively; subdisplays 72-75 relate to geographic locations of the active array as a function of time; subdisplay 76 specifies the position of the slave reference; status subdisplay 77 specifies (by code) the occurrence of certain activities during the exploration operation which may be accompanied by an audio alarm to indicate the immediate need for operator intervention, the meaning of the status code at subdisplay 77 being as set forth below, in Table I.

TABLE I

| Code | Activity |
| --- | --- |
| 0 | Setup for sequence start operation |
| 1 | Geometrical mistie |
| 2 | Ready for update or update in progress (if in auto mode) |
| 3 | Roll Switch Moving |
| 4 | Roll Switch (Stopped in position) |
| 5 | Roll Switch Disabled |
| 6 | Slave Reference Code Received |
| 7 | Transmission Reference Error (slave reference code not received) |
| 8 | Load Ref Output At Shift Register |
| 9 | Transmit (one bit of ref code) |

TABLE I-continued

| Code | Activity |
| --- | --- |
| A | Gap Set Mistie |
| D | Occurrence of Last Shot |
| 1X | Beeper On With Status Displayed as to Code 0, 1, . . . 9, A, D, alone. |
| 53 | Step Roll Switch Up With Beep on and Code "3" |
| 93 | Step Roll Switch Down With Beep on and Code "3". |

Explanation of Table I: status code "0" occurs any time that the controller 20 is powered up to cue the operator that all input data at the encoders 26 must then be set. Sequencing start button 59 terminates the cueing operation; status code "D" indicates that the last shot position is at hand and thus, the truck location and connection station vis-a-vis the array must be changed; status codes "3", "4", "5" and "53" and "93" indicate certain roll switch activities. If there are errors in the programmed exploration activity, warning codes are also generated by the status codes "1"; and "7".]

OPERATIONAL SEQUENCE

Assume the operator has initially calibrated the start-up positions of the array and source with the surveyed locations. As previously indicated in regard to FIG. 4, this entails encoding of positional data via encoders 26 in conjunction with proper setting of the switching arrays 54, 55. The result: corresponding shot, spread and associated data appear at the displays 27 due to the interaction of data relationship established through operation of the microcomputer 25 of FIG. 2. In order to better understand how the present invention uses all data, perhaps a brief overview of the hardware aspects of the microprocessor 30 is in order and is presented below in connection with FIG. 5.

It should be initially noted that MPU 30 is preferably an Intel 8085 microprocessor, a product of Intel Incorp., Cupertino, Calif. As is well known, it has a microprocessor and controller integrated into a single chip. It also includes an array of registers 82 tied to an ALU 83 via an internal data bus 84 controlled via control unit 85. Program counter 86 and instructional register 87 have dedicated uses; the other registers, such as accumulator 88, have more general uses. In the 8085, expanded control functions result because the low-eight (8) address bits have the capability of being multiplexed. Such operation occurs at the beginning of each instructional cycle; the low-eight address lines appear via ALE line 89 for control of different elements of the location, including encoders 26, displays 27, and printer 35 through I/O interface array 34.

UPDATING SEQUENCE

The foregoing operations, of course, assume (i) that the source 16, FIG. 1, is of the impulsive type, and (ii) that changes in array and source parameters vis-a-vis positions along the survey, occur—automatically—through execution of a series of steps that comprises loop 100 of FIG. 7.

As shown in FIG. 7, after the answer at decision step 102 is a positive one (i.e., the testing of mode switch 64 of the switch matrix associated with encoders 26 of FIG. 4, is affirmative), step 103 is executed. New array parameters are then generated say via step 104.

On the other hand, if mode switch 64 is in an opposite operating state (say state ZERO), step 102 executes the loop in an opposite mode, say via entry into loop 105.

Within the loop 105 there is an initial query of the update switch status (viz., status of update switch 65 of FIG. 4) via decisional step 106. If the answer to step 106 is in the affirmative, then updating of the data via step 104 occurs.

Since updating step 104 is used in the execution of both loops 100 and 105, a brief description of step 104 is in order and is provided via FIG. 8.

As shown in FIG. 8, initial execution of update step 104 depends on the answer provided at decisional step 107. If the answer provided by step 107 is in the affirmative then loop 108 is entered; if the answer is in the negative, then loop 109 is executed.

In more detail loop 108 is entered, of course, if and only if, the tested status of a particular element of the switch array 55 is negative, i.e., that rollalong switch 63 of FIG. 4 is in a disabled state. Such a state is indicative of the use of a vibratory source in the data-gathering operations (and secondarily, that the sweep count maximum also encoded in the controller has not occurred).

On the other hand, loop 109 is executed if and only if, the roll switch status in the controller, is positive, i.e., that the switch 63 of FIG. 4 is in an enabled state. Then as shown in FIG. 8, updating steps 110, 111, and 112 of the loop 109 are executed in sequence, using inter alia, the sets of equations A, B, C and D shown below. In more detail, note that the operational sequence in loop 109 is conventionally dependent upon common sign relationships and notations, but also note that the solutions of each modified Equation Sets A, B, C, and D do not require extensive annotation.

UPDATE SEQUENCE EQUATION SET A

For both the ground location numbers and data channel numbers increasing along the line of survey, the following set of equations are used by the microcomputer system of the present invention:

$$\text{RLSP (N)} = \text{RLSP (N}-1) + \text{Roll} \quad (1)$$

$$\text{END 1 (N)} = \text{END 1 (N}-1) + \text{Roll} \quad (2)$$

$$\text{END 2 (N)} = \text{END 2 (N}-1) + \text{Roll} \quad (3)$$

If GPNO = 0

GAP 1 = 0 = GAP 2

If GPNO > 0

$$\text{GAP 1 (N)} = \text{GAP 1 (N}-1) + \text{Roll} \quad (4)$$

$$\text{GAP 2 (N)} = \text{GAP 2 (N}-1) + \text{Roll} \quad (5)$$

$$\text{SHLO (N)} = \text{SHLO (N}-1) + \text{Roll} \quad (6)$$

$$\text{SHNO (N)} = 01 \quad (7)$$

UPDATE SEQUENCE EQUATION SET B

With the ground location numbers increasing but the data channel numbers decreasing, the microcomputer system uses:

$$\text{RLSP (N)} = \text{RLSP (N}-1) - \text{Roll} \quad (1)$$

$$\text{END 1 (N)} = \text{END 1 (N}-1) + \text{Roll} \quad (2)$$

$$\text{END 2 (N)} = \text{END 2 (N}-1) + \text{Roll} \quad (3)$$

If GPNO = 0

GAP 1 = 0 = GAP 2

If GPNO > 0

$$\text{GAP 1 (N)} = \text{GAP 1 (N}-1) + \text{Roll} \quad (4)$$

$$\text{GAP 2 (N)} = \text{GAP 2 (N}-1) + \text{Roll} \quad (5)$$

$$\text{SHLO (N)} = \text{SHLO (N}-1) + \text{Roll} \quad (6)$$

$$\text{SHNO (N)} = 01 \quad (7)$$

UPDATE SEQUENCE EQUATION SET C

With the ground location numbers decreasing but the channel numbers increasing, the microcomputer uses:

$$\text{RLSP (N)} = \text{RLSP (N}-1) + \text{Roll} \quad (1)$$

$$\text{END 1 (N)} = \text{END 1 (N}-1) - \text{Roll} \quad (2)$$

$$\text{END 2 (N)} = \text{END 2 (N}-1) - \text{Roll} \quad (3)$$

If GPNO = 0

GAP 1 = 0 = GAP 2  (4)

If GPNO > 0

$$\text{GAP 2 (N)} = \text{GAP 1 (N}-1) - \text{Roll} \quad (5)$$

$$\text{SHLO (N)} = \text{SHLO (N}-1) - \text{Roll} \quad (6)$$

$$\text{SHNO (N)} = 01 \quad (7)$$

UPDATE SEQUENCE EQUATION SET D

For both ground location and data channel numbers decreasing, the microcomputer system uses:

$$\text{RLSP (N)} = \text{RLSP (N}-1) - \text{Roll} \quad (1)$$

$$\text{END 1 (N)} = \text{END 1 (N}-1) - \text{Roll} \quad (2)$$

$$\text{END 2 (N)} = \text{END 2 (N}-1) - \text{Roll} \quad (3)$$

If GPNO = 0

GAP 1 = 0 = GAP 2  (4)

If GPNO > 0

$$\text{GAP 2 (N)} = \text{GAP 1 (N}-1) - \text{Roll} \quad (5)$$

$$\text{SHLO (N)} = \text{SHLO (N}-1) - \text{Roll} \quad (6)$$

$$\text{SHNO (N)} = 01 \quad (7)$$

Table I below defines the notations used above in connection with the Equation Sets A–D.

TABLE I

| Notation | DEFINITION |
|---|---|
| SHLO | Energy source location |
| SHNO | Energy source number |
| REF | Location of reference sensor |
| ROOM | No. of rollalong switch positions available for advancing the active spread |
| TR | Ground reference for recorder location |
| PNO | Number of geophone groups in the GAP |
| GPLOC | Location of the GAP |
| K | Number of data channels in recording system |

TABLE I-continued

| Notation | DEFINITION |
|---|---|
| | (24, 48, 60, 96, 120, etc). |
| END 1 | Ground location of the geophone group interconnected through the rollalong switch to the first data channel of the recorder. |
| END 2 | Ground location of the Kth data channel |
| GAP 1 | Ground location of the data channel below the GAP on the first data channel side. |
| GAP 2 | Ground location of the data channel above the GAP toward the Kth channel. |
| RLSP | Rollalong switch position required for a desired active spread location. |
| NP | Number of rollalong switch positions available minus 1. (N−1). Rollalong switch must be configured for K+N inputs and K outputs. |
| GL(+) | Ground location numbers along the seismic line increasing numerically in the direction in which the active geophone array is advanced for each successive record sequence |
| GL(−) | Ground locations numbers decreasing numerically in the direction in which the active spread is advanced. |
| CH(+) | Seismic data channel increasing (1 to K) numerically along the active spread in the direction in which the active spread is advanced. |
| CH(−) | Seismic data channels numerically decreasing (from K to 1) in the direction in which the active spread is advanced. |

Note that the microcomputer system 25 operating in an update sequence will, in addition to solving the appropriate equations, also update the status of the number of roll switch positions (ROOM) available for advancing the array. In the event that ROOM=0 following an update command, the LAST SHOT status light can be activated. This informs the operator that the active spread cannot be further advanced unless the present location of the recording truck is changed. It should be noted that if decision loop 109 of FIG. 8 is entered using the microcomputer system 25, the latter does not execute instructions associated with equation sets A, B, C or D but instead it executes instructions in the manner of steps 114, 115 and 116, using selected portions of the routines set forth in FIGS. 6A–6D, in the manner indicated.

It should be understood that the invention is not only directed to the specific embodiments set forth above, but that many variations are readily apparent to those skilled in the art, so thus the invention is to be given the broadest possible interpretation within the terms of the following claims.

What is claimed is:

1. A method of conditionally updating array and source parameters related to an exploration system during generation and collection of seismic data by a source-detector array positioned at known locations along a line of survey at the earth's surface in operational contact with a rollalong switch capable of changing switch matrix size and hence "active" detector position on command, based on type of source being used by said exploration system, said updated parameters being generated as bits of digital data in a microcomputer system that includes a microprocessor unit (MPU), memory units and display, switching and alarm means interconnected to each other and to a digital field system (DFS) via a system bus, comprising:

(a) after an interrupt request has been generated by said microcomputer system, automatically determining switch status of a switch of said display, switching and alarm means, (b) if said switch of (a) is in a first state, designating a vibratory source is being used in said exploration system, enabling an audio alarm of said display switch and alarm means to alert a human operator that an exploration cycle is beginning followed by incrementing of a shot number counter of said microcomputer system and displaying said updated number at said display switch and alarm means, for operator perusal, (c) if the switch of (a) is in a second state, signifying that an impulsive source is in use in which a single activation per shot location occurs, after determining roll direction, calculating via said microcomputer system (i) new spread end positions for next-in-time source activation, (ii) new gap positions for said spread, and (iii) a new rollalong switch position, (d) displaying the data of (c) in alpha-numeric form at said display, switching and alarm means of said microcomputer system, for operator examination and for correction, if required.

2. Method of claim 1 with the additional step of cross-checking said displayed data with other stored data, whereby errors can be detected and corrected.

3. A ground position controller for manipulating, calculating, storing, and conditionally updating array parameters associated with a digital exploration system during generation and collection of seismic data by a source-detector array positioned at known locations along a line of survey at the earth's surface, in operational contact with a rollalong switch capable of changing switch matrix size and hence "active" detector length and position on command based on source type, said updated data being generated as bits of digital data in a microcomputer system that includes a microprocessor unit (MPU), memory units, and display, switching and alarm means interconnected to each other and to a digital field system (DFS) via a system bus, said display, switching and alarm means including separate encoding means for automatically encoding digital data related to array geometry and exploration parameters that allow repetition in sequence of activities along said line of survey, separate display means for automatically displaying at least a portion of said encoded data in alpha-numeric form for operator examination and for correction, if required, separate switch means connected to said microcomputer system and audio alarm means disconnectably connected to said separate switch means whereby if a vibratory source is used, the start of each sweep cycle is audibly indicated so that source type is identified and operational update sequence determined.

4. Controller of claim 3 in which said operation of said audio alarm means is dependent upon switch state (ONE, ZERO) of said separate switch means whereby if a vibratory source is used, the start of each sweep cycle is audibly indicated.

5. Controller of claim 4 in which said display, and switching and alarm means devices of said microcomputer system also includes a sweep count indicator whose operation is also dependent upon switch state of said separate switch means.

* * * * *